(12) United States Patent
Kim et al.

(10) Patent No.: US 12,533,914 B2
(45) Date of Patent: Jan. 27, 2026

(54) TIRE PROVIDED WITH 3D KERFS COMBINING INTERLOCKING BANDS AND HIDDEN GROOVE-TYPE KERFS

(71) Applicant: Hankook Tire & Technology Co., Ltd., Seongnam-si (KR)

(72) Inventors: Hee Kyung Kim, Daejeon (KR); Su Bin Choi, Daejeon (KR)

(73) Assignee: Hankook Tire & Technology Co., Ltd., Seongnam-si (KR)

( * ) Notice: Subject to any disclaimer, the term of this patent is extended or adjusted under 35 U.S.C. 154(b) by 0 days.

(21) Appl. No.: 18/852,138

(22) PCT Filed: Mar. 10, 2023

(86) PCT No.: PCT/KR2023/003307
§ 371 (c)(1),
(2) Date: Sep. 27, 2024

(87) PCT Pub. No.: WO2023/191341
PCT Pub. Date: Oct. 5, 2023

(65) Prior Publication Data
US 2025/0206069 A1    Jun. 26, 2025

(30) Foreign Application Priority Data

Mar. 29, 2022  (KR) .................. 10-2022-0039209

(51) Int. Cl.
*B60C 11/12* (2006.01)
*B60C 11/13* (2006.01)

(52) U.S. Cl.
CPC ...... *B60C 11/1218* (2013.01); *B60C 11/1353* (2013.01); *B60C 2011/1361* (2013.01)

(58) Field of Classification Search
CPC .. B60C 11/1281; B60C 11/1218; B60C 11/12
See application file for complete search history.

(56) References Cited

U.S. PATENT DOCUMENTS

2013/0306209 A1*  11/2013  Bonnamour ........ B60C 11/1218
                                                                152/209.21
2019/0184759 A1*   6/2019  Tomita ................ B60C 11/0309
(Continued)

FOREIGN PATENT DOCUMENTS

JP    2014-509980 A    4/2014
KR    10-0493663 B1    6/2005
(Continued)

*Primary Examiner* — Justin R Fischer
*Assistant Examiner* — Nicholas J Weiler
(74) *Attorney, Agent, or Firm* — Bridgeway IP Law Group, PLLC; Jihun Kim

(57) ABSTRACT

An embodiment relates to a tire in which kerf space can be secured after tread wear without a decrease in block rigidity. The tire provided with 3D kerfs combining interlocking bands and hidden groove-type kerfs according to an embodiment comprises: kerfs that are provided with road surface portions and bottom portions; and protrusion parts that protrude from one of the two side wall surfaces of the road surface portions, wherein the road surface portions are spaces extending, in the thickness direction of the blocks, from the outer surface of the blocks in contact with the road surface, and the bottom portions are spaces extending from the road surface in the thickness direction of the block.

6 Claims, 13 Drawing Sheets

(56) References Cited

U.S. PATENT DOCUMENTS

2019/0241022 A1\* 8/2019 Ishigaki ............. B60C 11/1218
2020/0180362 A1\* 6/2020 Kaji ....................... B60C 11/12

FOREIGN PATENT DOCUMENTS

| KR | 10-2005-0097708 A | 10/2005 |
|----|-------------------|---------|
| KR | 10-1016271 B1 | 2/2011 |
| KR | 10-1038020 B1 | 5/2011 |
| KR | 10-2034803 B1 | 10/2019 |

\* cited by examiner

| Kerf type | Shape | | Block rigidity (stiffness) |
|---|---|---|---|
| | Road surface portion thickness t1 | Distance t2 between protrusion part and other side wall surface of road surface portion in kerf | Braking direction |
| Comparative example | 0.6 | 0 | 100.0% |
| First embodiment | 0.6 | 0.3 | 99.9% |
| | 0.6 | 0.4 | 101.8% |
| Second embodiment | 0.6 | 0.3 | 100.7% |
| | 0.6 | 0.4 | 102.5% |
| Third embodiment | 0.6 | 0.3 | 99.3% |
| | 0.6 | 0.4 | 101.4% |
| Fourth embodiment | 0.6 | 0.3 | 98.1% |
| | 0.6 | 0.4 | 101.4% |

FIG. 11

TIRE PROVIDED WITH 3D KERFS COMBINING INTERLOCKING BANDS AND HIDDEN GROOVE-TYPE KERFS

TECHNICAL FIELD

The present invention relates to a tire provided with 3D kerfs combining interlocking bands and hidden groove-type kerfs, and more specifically, a kerf space can be secured after tread wear without a decrease in block rigidity.

BACKGROUND ART

In general, in the case of a pattern formed in the tread of a tire, a void within the tire pattern decreases as the tread wears, and this reduced space can cause problems such as reduced drainage in a water film, reduced traction on a road surface covered with snow, and reduced braking performance on a wet road surface.

Various attempts are being made to compensate for the decrease in void volume within the tread due to the groove and kerf that decrease as the tread wears, and from the groove perspective, when the inclination angle of the groove sidewall is 90 degrees or a reverse inclination is applied, the rigidity of the block forming the pattern decreases, resulting in a decrease in braking performance and handling performance on a rough road surface; therefore, an unintended trade-off phenomenon may occur.

This has led to a need for a method to secure a kerf space even after tread wear without reducing block rigidity in terms of kerf.

In Korean Patent No. 10-1038020 (title of the invention: TREAD KERF STRUCTURE OF MEDIUM-LOAD TIRE FOR IMPROVING DURABILITY AND DRAINAGE), in a tread kerf structure of a heavy load tire in which in order to improve the braking performance and durability on the water and icy surface, the lower end part of a kerf 2 has a volume larger than that of an opening 2a of the kerf 2, the horizontal wave-shaped opening 2a of the kerf 2 communicates with the lower end part of the kerf 2 by a vertical waveform connection hole 2b, and a flow path pipe 3 formed at the lower end part of the kerf 2 is composed of a plurality of sawtooth cylindrical tubes 3a formed along the length direction of the flow path pipe 3 as blade rubber is protruded at an equal angle along the inner direction.

RELATED ART

Republic of Korea Patent No. 10-1038020

DETAILED DESCRIPTION OF THE INVENTION

Technical Problem

The present invention is to provide a tire in which a kerf space can be secured after tread wear without a decrease in block rigidity.

The aspect of the present invention is not limited to that mentioned above, and other aspects not mentioned will be clearly understood by those skilled in the art from the description below.

Technical Solution

To this end, according to the present invention, a tire with a block includes: a kerf having a road surface portion, which is a space formed by extending in the thickness direction of the block from the outer surface of the block in contact with a road surface, and a bottom portion, which is a space formed by extending in the thickness direction of the block from the road surface portion; and a protrusion part formed in a shape that protrudes from one of opposite side wall surfaces of the road surface portion, wherein the distance between opposite side wall surfaces of the bottom portion is variable in the depth direction of the bottom portion.

In an embodiment of the present invention, each of the opposite side wall surfaces of the road surface portion may be formed in the shape of a continuous surface.

In an embodiment of the present invention, the distance between the opposite side wall surfaces of the bottom portion gradually may increase as the depth of the bottom portion increases.

In an embodiment of the present invention, as the depth of the bottom portion increases, the distance between the opposite side wall surfaces of the bottom portion may gradually increase and then become constant.

In an embodiment of the present invention, the tire may further include a channel portion having a channel formed in the shape of a groove extending in the depth direction of the road surface portion at a corresponding position of each of the opposite side wall surfaces of the road surface portion.

In an embodiment of the present invention, the distance between the opposite side wall surfaces of the bottom portion gradually may increase as the depth of the bottom portion increases.

In an embodiment of the present invention, as the depth of the bottom portion increases, the distance between the opposite side wall surfaces of the bottom portion may gradually increase and then become constant.

In an embodiment of the present invention, the protrusion part may have a rectangular solid shape.

In an embodiment of the present invention, the kerf may have a curved shape extending in the lengthwise direction of the kerf.

Advantageous Effects

Even if the depth of a road surface portion decreases due to wear of tread, a kerf space is secured by a bottom portion, so that the drainage performance, braking performance, and traction performance due to the kerf can be maintained above the standard value.

The effects of the present invention are not limited to the effects described above, and should be understood to include all effects that are inferable from the configuration of the present invention described in the detailed description or claims of the present invention.

BRIEF DESCRIPTION OF THE DRAWINGS

FIG. 11 is data on tests using blocks of respective embodiments and comparative example of the present invention.

BEST MODE FOR CARRYING OUT THE INVENTION

Figure 1:
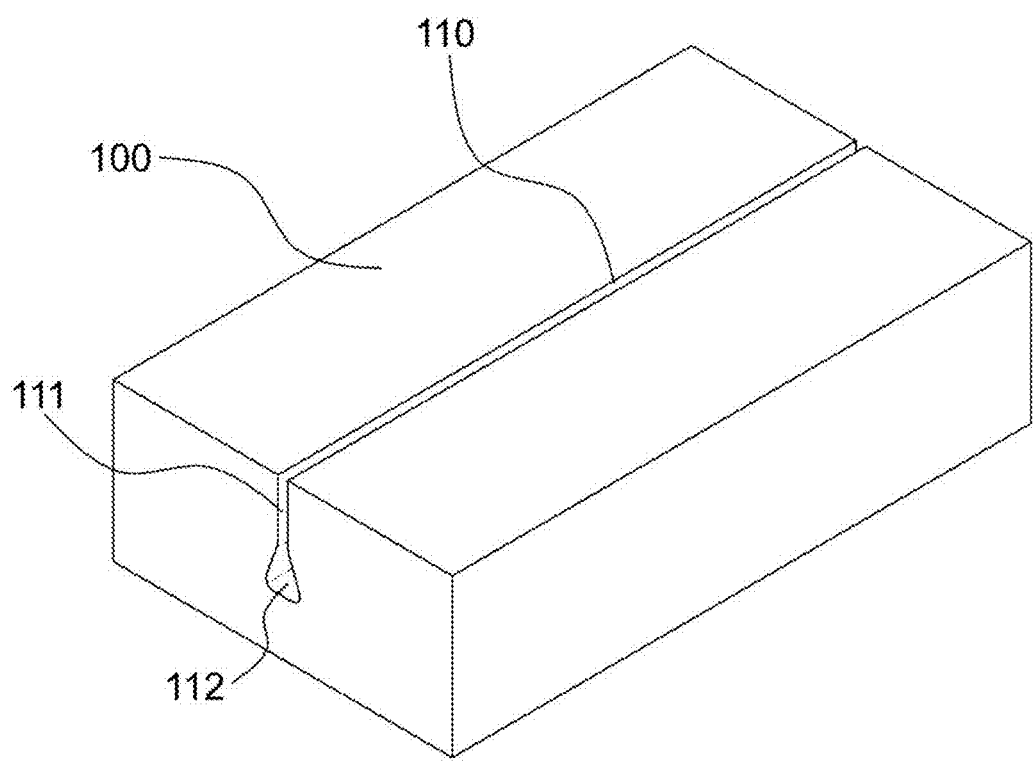
FIG. 1 is a perspective view of a block according to a first embodiment of the present invention.

In the most preferred embodiment according to the present invention, a tire with a block includes: a kerf having a road surface portion, which is a space formed by extending in the thickness direction of the block from the outer surface of the block in contact with a road surface, and a bottom portion, which is a space formed by extending in the thickness direction of the block from the road surface portion; and a protrusion part formed in a shape that protrudes from one of opposite side wall surfaces of the road surface portion, wherein the distance between opposite side wall surfaces of the bottom portion is variable in the depth direction of the bottom portion.

MODE FOR CARRYING OUT THE INVENTION

Hereinafter, the present invention will be described with reference to the accompanying drawings. However, the present invention may be implemented in various different forms and, therefore, is not limited to the embodiments described herein. In order to clearly explain the present invention in the drawings, portions unrelated to the description are omitted, and similar portions are given similar reference numerals throughout the specification.

Throughout the specification, when a portion is said to be "connected (linked, contacted, combined)" with another portion, this includes not only a case of being "directly connected" but also a case of being "indirectly connected" with another member in between. In addition, when a portion is said to "include" a certain component, this does not mean that other components are excluded, but that other components may be added, unless specifically stated to the contrary.

The terms used herein are merely used to describe specific embodiments and are not intended to limit the present invention. Singular expressions include plural expressions unless the context clearly dictates otherwise. In this specification, it should be understood terms such as "include" or "have" are to designate the presence of features, numbers, steps, operations, components, parts, or combinations thereof described in the specification, but are not to exclude in advance the possibility of the presence or addition of one or more other features, numbers, steps, operations, components, parts, or combinations thereof.

Hereinafter, an electrolyte material for a solid oxide fuel cell, which is an embodiment of the present invention, will be described in detail.

Figure 2A:
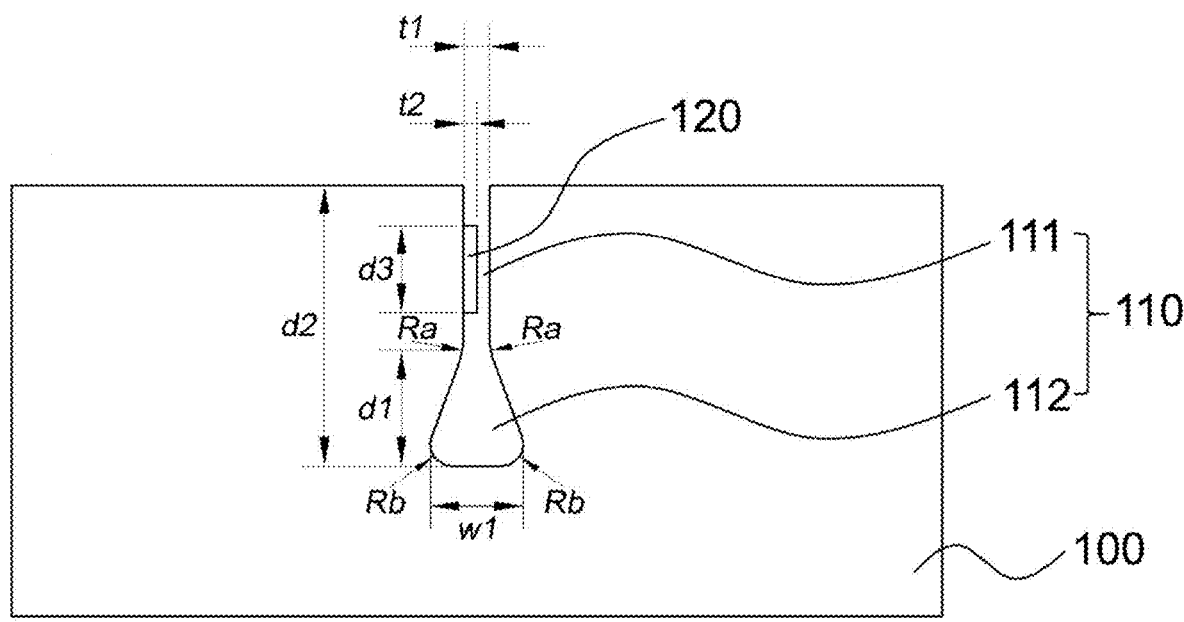
FIGS. 2A and 2B are a cross-sectional view and a plan view of a block according to a first embodiment of the present invention.
Figure 2B:
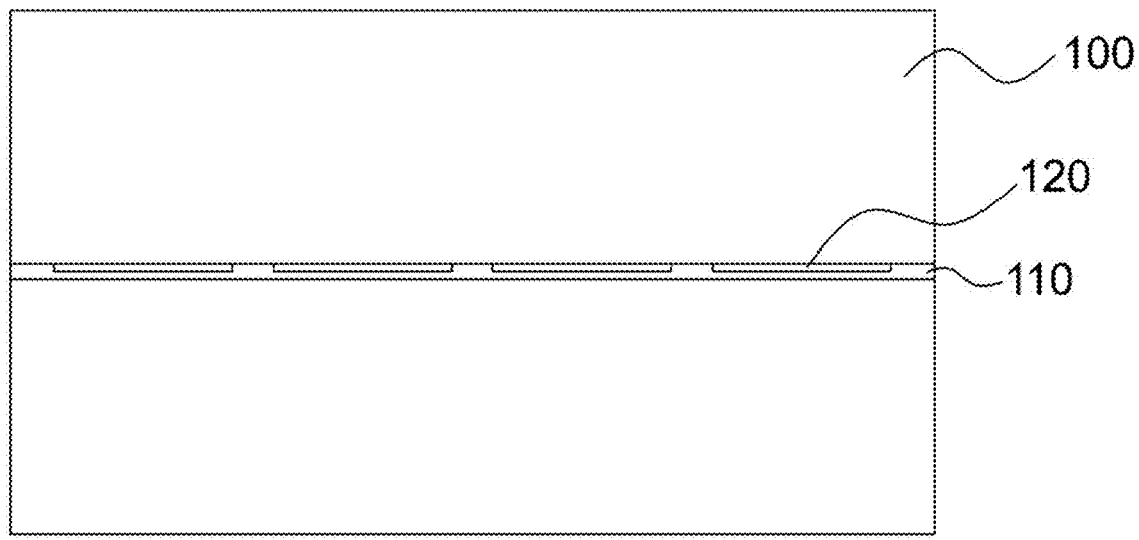

FIG. 1 is a perspective view of a block 100 according to a first embodiment of the present invention, and FIGS. 2A and 2B are a cross-sectional view and a plan view of a block 100 according to a first embodiment of the present invention. Here, FIG. 2A is a cross-sectional view of a block 100 according to a first embodiment. The cross-sectional view of a block 100 is across-sectional view perpendicular to the longitudinal extension direction of kerf 110. The same applies hereinafter. In addition, FIG. 2B is a plan view of a block 100 according to a first embodiment.

Figure 3:
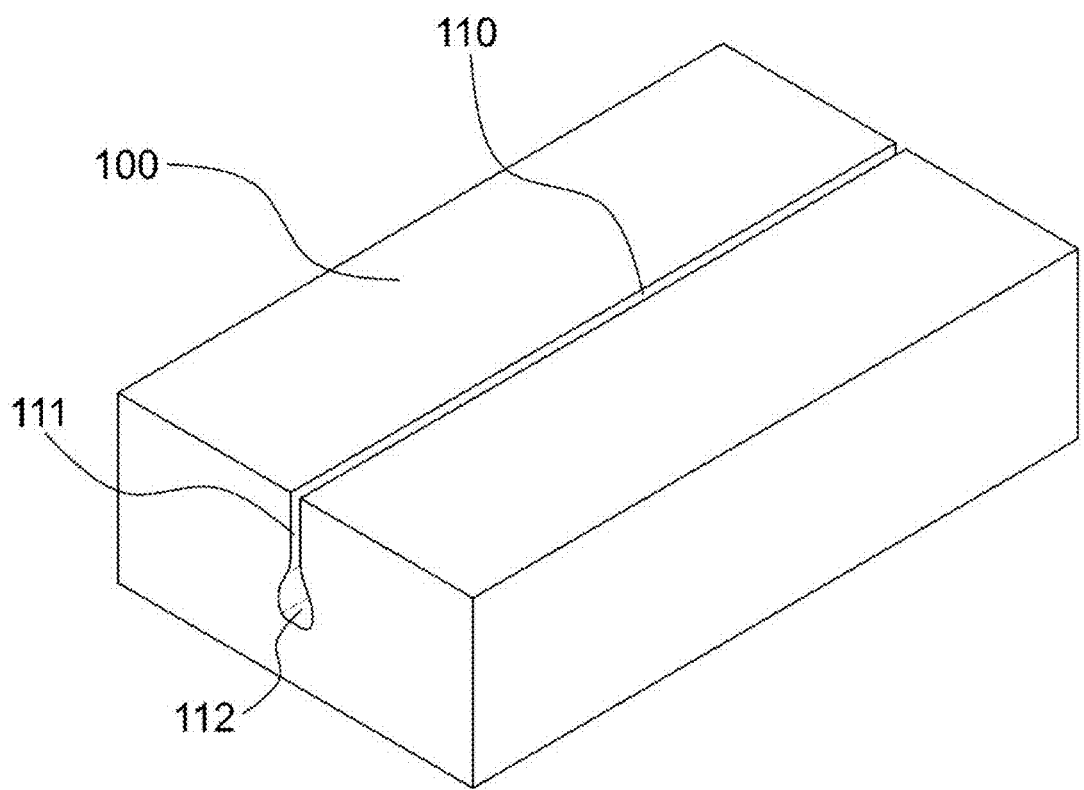
FIG. 3 is a perspective view of a block according to a second embodiment of the present invention.
Figure 4A:
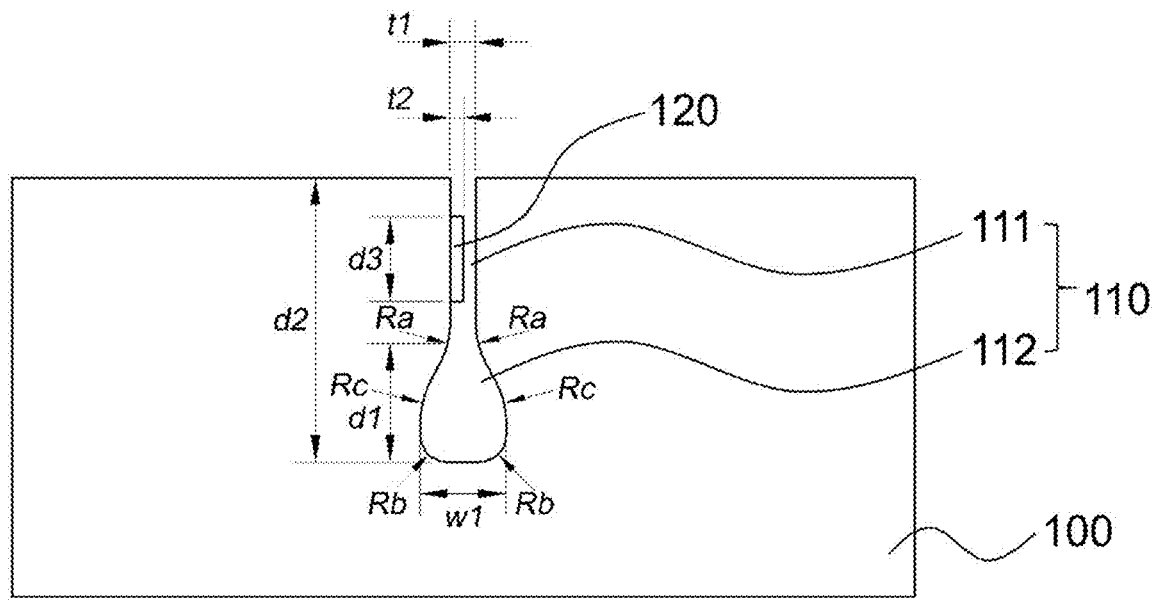
FIGS. 4A and 4B are a cross-sectional view and a plan view of a block according to a second embodiment of the present invention.
Figure 4B:
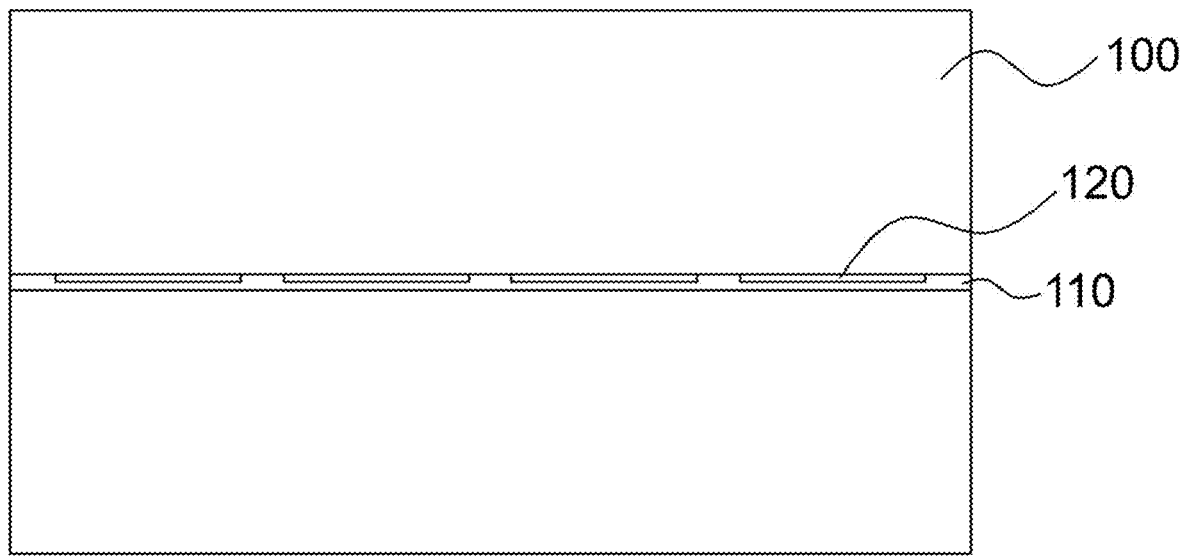

FIG. 3 is a perspective view of a block 100 according to a second embodiment of the present invention, FIGS. 4A and 4B are a cross-sectional view and a plan view of a block 100 according to a second embodiment of the present invention. Here, FIG. 4A is a cross-sectional view of a block 100 according to a second embodiment, and FIG. 4B is a plan view of a block 100 according to a second embodiment.

Figure 5:
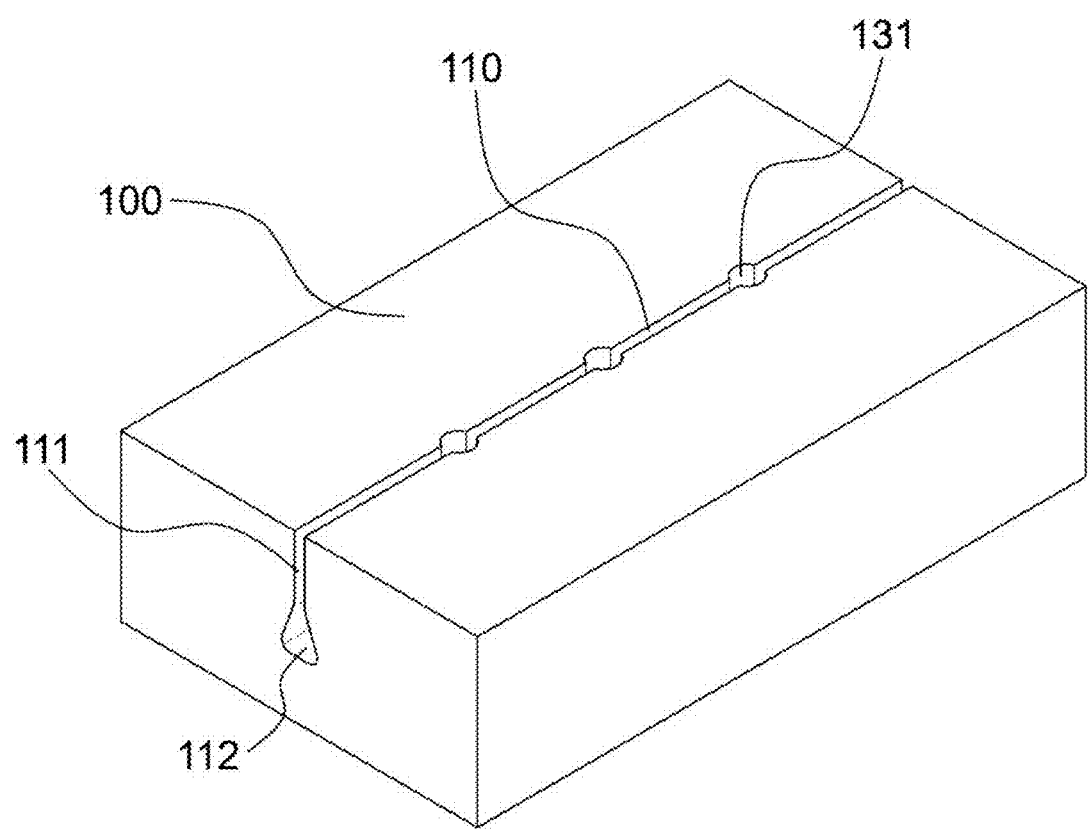
FIG. 5 is a perspective view of a block according to a third embodiment of the present invention.
Figure 6A:
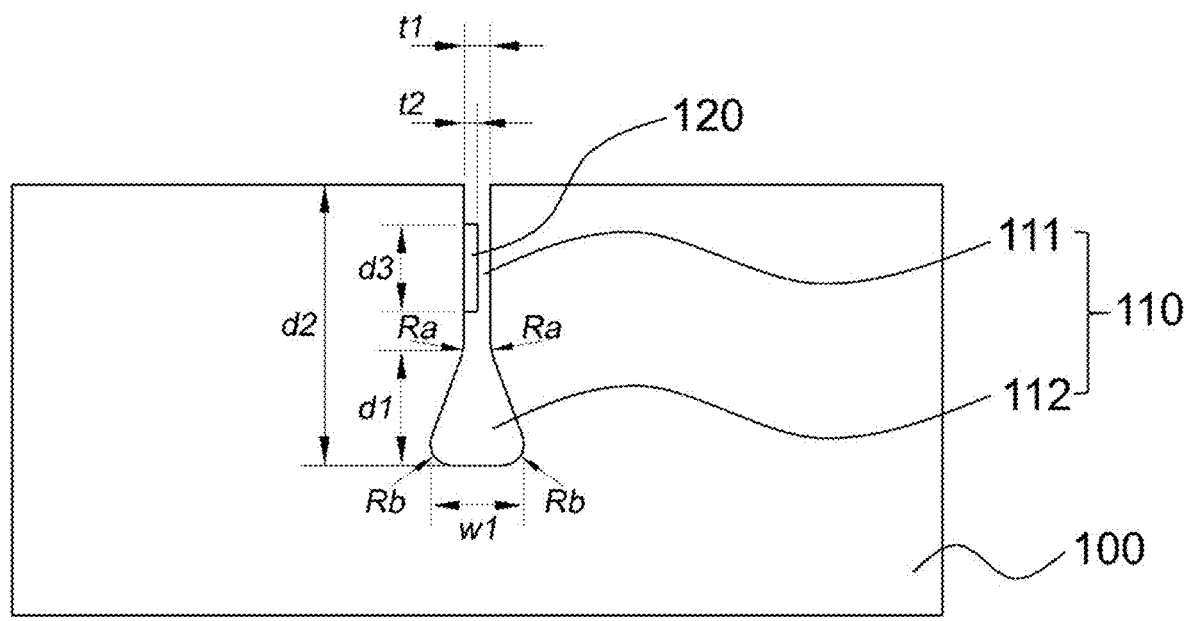
FIGS. 6A and 6B are a cross-sectional view and a plan view of a block according to a third embodiment of the present invention.
Figure 6B:
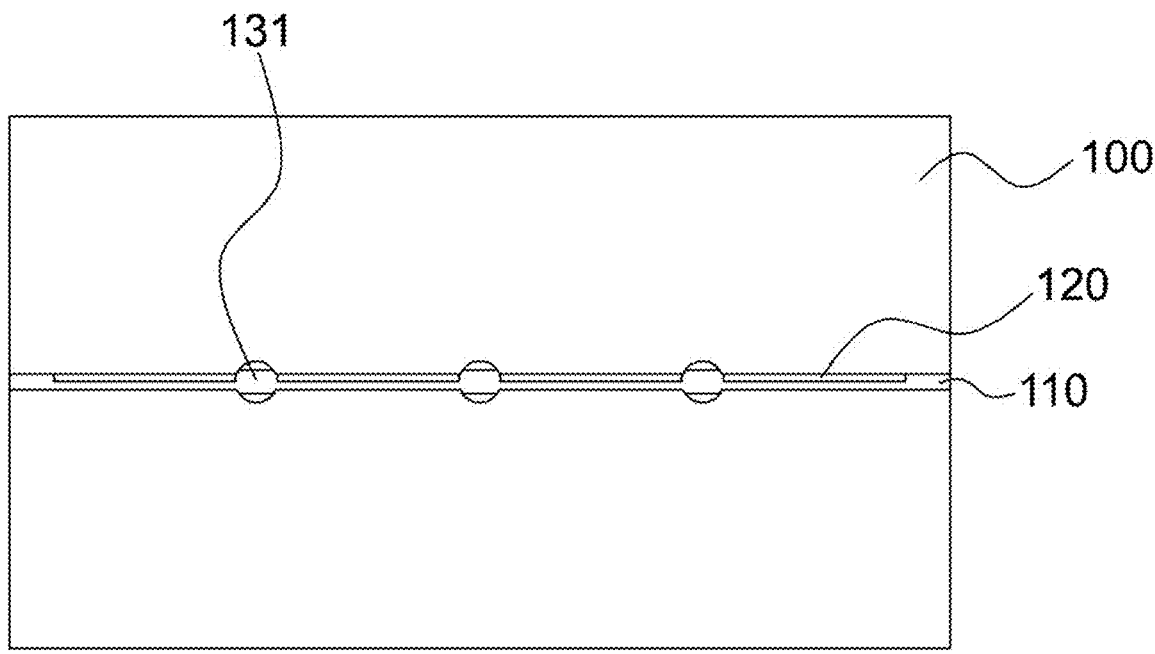

FIG. 5 is a perspective view of a block 100 according to a third embodiment of the present invention, FIGS. 6A and 6B are a cross-sectional view and a plan view of a block 100 according to a third embodiment of the present invention. Here, FIG. 6A is a cross-sectional view of a block 100 according to a third embodiment, and FIG. 6B is a plan view of a block 100 according to a third embodiment.

Figure 7:
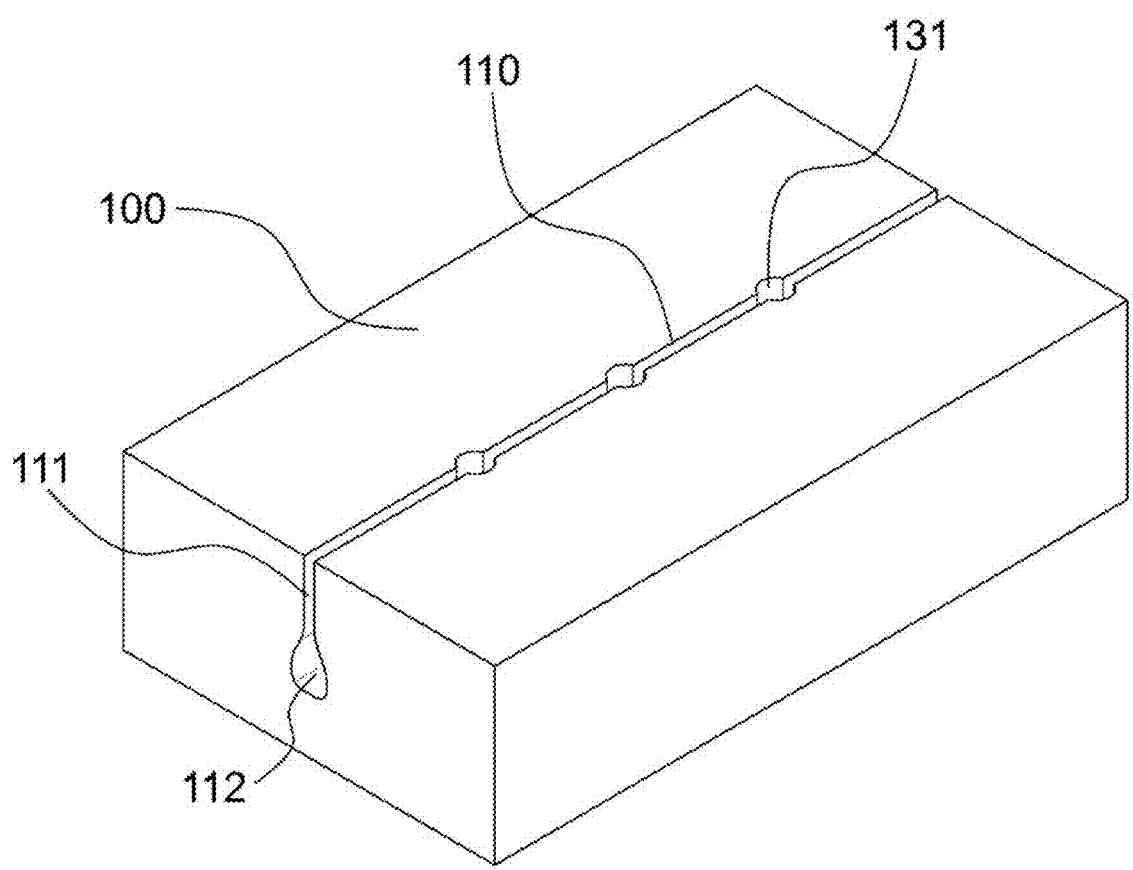
FIG. 7 is a perspective view of a block according to a fourth embodiment of the present invention.
Figure 8A:
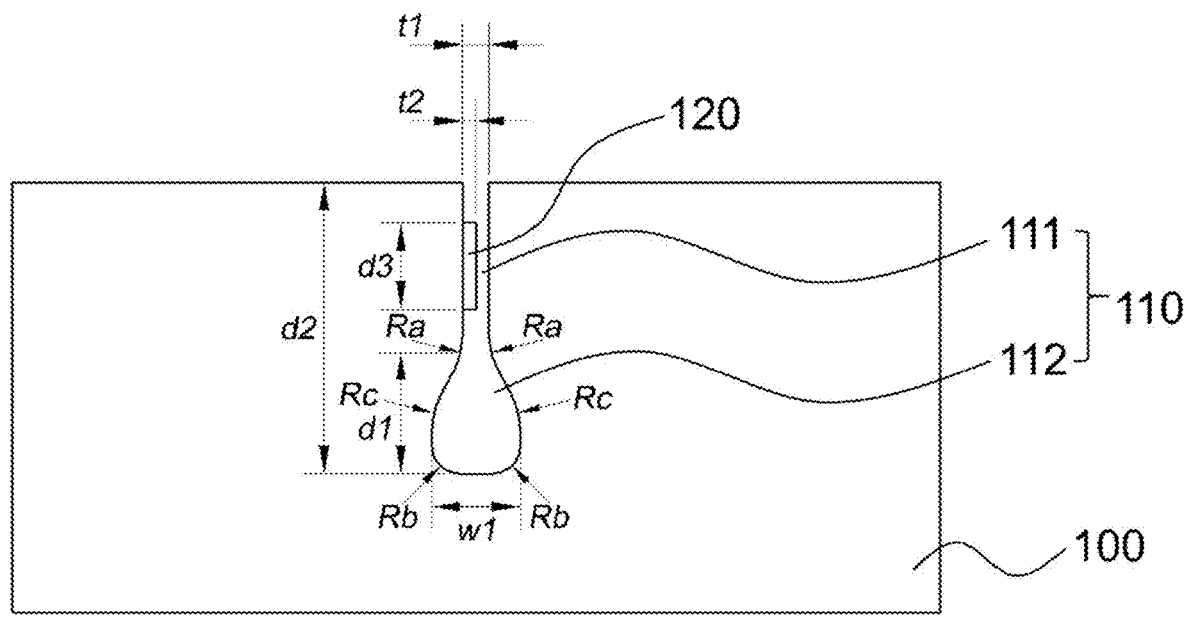
FIGS. 8A and 8B are a cross-sectional view and a plan view of a block according to a fourth embodiment of the present invention.
Figure 8B:
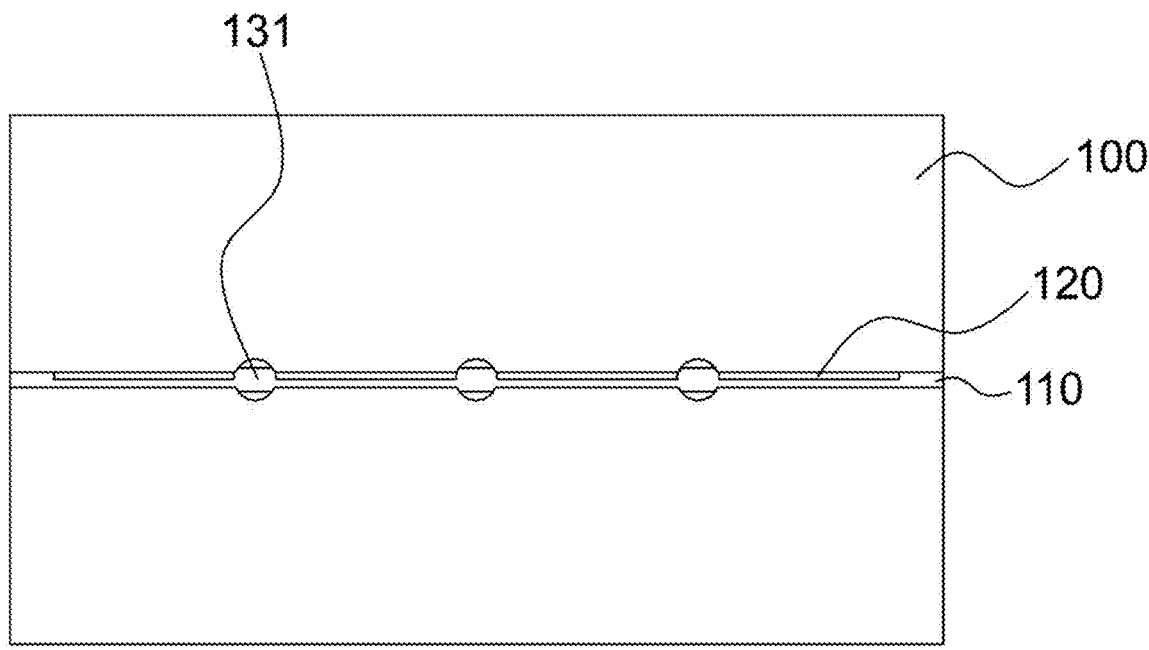

FIG. 7 is a perspective view of a block 100 according to a fourth embodiment of the present invention, FIGS. 8A and 8B are a cross-sectional view and a plan view of a block 100 according to a fourth embodiment of the present invention. Here, FIG. 8A is a cross-sectional view of a block 100 according to a fourth embodiment, and FIG. 8B is a plan view of a block 100 according to a fourth embodiment.

As shown in FIGS. 1 to 8A and 8B, a tire with a block 100 of the present invention includes: a kerf 110 having a road surface portion 111, which is a space formed by extending in the thickness direction of the block 100 from the outer surface of the block 100 in contact with a road surface, and a bottom portion 112, which is a space formed by extending in the thickness direction of the block 100 from the road surface portion 111; and a protrusion part 120 formed in a shape that protrudes from one of opposite side wall surfaces of the road surface portion 111. In addition, the distance between opposite side wall surfaces of the bottom portion 112 may be variable in the depth direction of the bottom portion 112. This will be explained in detail below.

In addition, the protrusion part 120 may be formed so that each is spaced apart along the lengthwise direction of the opposite side wall surfaces of the road surface portion 111.

The average value of the distance between the opposite side wall surfaces of the bottom portion 112 may be formed to be greater than the average value of the distance between the opposite side wall surfaces of the road surface portion 111, and accordingly, even if the depth of the road surface portion 111 decreases due to wear of the tread, the kerf 110 space is secured by the bottom portion 112, so that the drainage performance, braking performance, traction performance, etc. by the kerf 110 may be maintained above the standard value.

Such an effect may be implemented by the kerf 110 shape of a block 100 of each of first to fourth embodiments described below. Hereinafter, each embodiment will be described in detail.

By forming the protrusion part 120 as described above, it is possible to prevent excessive deformation of the block 100 that occurs during braking or driving, and at the same time, to prevent the durability of the block 100 from deteriorating due to securing the volume of the kerf 110.

Specifically, when deformation of the block 100 occurs during braking or driving of the tire, the protrusion part 120 formed on one side wall surface of the road surface portion 111 comes into contact with the other side wall surface of the road surface portion 111 to support the shape of the kerf 110; therefore, excessive deformation of the block 100 and the kerf 110 may be prevented. Since the volume of the road surface portion 111 and the bottom portion 112 may be increased by the function of the protrusion part 120 as described above, the volume of the kerf 110 may be secured while increasing the durability of the kerf 110.

In each of embodiments described below, the protrusion part 120 may have a rectangular solid shape. In addition, at least one corner of the rectangular solid formed at a position spaced apart from one side wall surface of the road surface portion 111 may be rounded to have a curved surface.

Accordingly, even if the protrusion part 120 and the other side wall surface of the road surface portion 111 come into contact with each other and the protrusion part 120 is pressurized, the damage of the corner of the protrusion part 120 may be prevented, and the durability of the protrusion part 120 may be improved.

In embodiments of the present invention, the shape of the protrusion part 120 is described as above, but the shape of the protrusion part 120 is not necessarily limited to the above, and may have various shapes such as a semicircle or a polygon in the cross-section perpendicular to the depth direction of the kerf 110.

As shown in FIG. 1 and FIGS. 2A and 2B, in the kerf 110 formed in the block 100 according to a first embodiment of the present invention, each of the opposite side wall surfaces of the road surface portion 111 may be formed in the shape of a continuous surface. In addition, the distance between the opposite side wall surfaces of the bottom portion 112 may gradually increase as the depth of the bottom portion 112 increases.

Here, the shape of a continuous surface may mean a shape to distinguish it from a shape in which a groove (channel portion) is formed on the side wall surface and the surface is disconnected, and may mean that the surface is continuously formed without a disconnection in the middle. The same applies hereinafter.

As shown in FIG. 2A, in the cross-section perpendicular to the lengthwise direction of the block 100, as the depth of the bottom portion 112 in a first embodiment increases, the distance between the opposite side wall surfaces of the bottom portion 112 may gradually increase, so that an inclined surface, which is a portion inclined to both sides, may be provided.

By forming the slope as described above, the space volume of the kerf 110 increases due to the increase in the space of the bottom portion 112, and accordingly, the drainage performance of the kerf 110 may be improved. In addition, the cross-section of the bottom portion 112 has an overall triangular shape, so that the size of the cross-section of the bottom portion 112 gradually increases when worn, and the space (Void) of the kerf 110 may be secured.

The connection part between the road surface portion 111 and the slope may be rounded and formed as a curved surface having a curvature Ra, and the connection part between the bottom surface of the bottom portion 112, which is a plane, and the slope may also be rounded and formed as a curved surface having a curvature radius Rb.

Here, the curvature radius Ra of the connection part between the road surface portion 111 and the slope may be formed to be 0.5 to 5 mm. In addition, the curvature radius Rb of the connection part between the bottom surface of the bottom portion 112 and the slope may be formed to be 0.3 to 1.5 mm. In addition, the width w1 of the bottom surface may be formed to be 3 mm or less.

The depth d1 of the bottom portion 112 may be formed to be 2 to 6 mm. In addition, the total depth d2 of the kerf 110 may be formed to be 5 to 10 mm. In addition, the height d3 of the protrusion part 120 may be formed to be 1.5 to 5 mm.

In a first embodiment, the opposite side wall surfaces of the road surface portion 111 may be formed as a plane, and accordingly, the thickness t1 of the road surface portion 111, which is the distance between the opposite side wall surfaces of the road surface portion 111, may be formed uniformly along the depth direction of the road surface portion 111. Here, the thickness t1 of the road surface portion 111 may be formed to be 0.4 to 0.8 mm. In addition, the distance t2 between the protrusion part 120 and the other side wall surface of the road surface portion 111 may be formed to be 0.2 to 0.6 mm.

Each numerical range in a first embodiment is not limited, and each numerical range may be changed according to the required performance of the block 100.

As shown in FIGS. 3 and 4A and 4B, in the kerf 110 formed in the block 100 according to a second embodiment of the present invention, each of the opposite side wall surfaces of the road surface portion 111 may be formed in the shape of a continuous surface. In addition, the distance between the opposite side wall surfaces of the bottom portion 112 may gradually increase as the depth of the bottom portion 112 increases and then become constant.

Here, the shape of a continuous surface may mean a shape to distinguish it from a shape in which a groove (channel portion) is formed on the side wall surface and the surface is disconnected, and may mean that the surface is continuously formed without a disconnection in the middle. The same applies hereinafter.

As shown in FIG. 4A, in the cross-section perpendicular to the lengthwise direction of the block 100, as the depth of the bottom portion 112 increases, the distance between the opposite side wall surfaces of the bottom portion 112 gradually increases and then becomes constant, so that an inclined plane, which is a portion inclined on both sides, and a vertical plane extending from the inclined plane in a direction perpendicular to the bottom surface may be provided.

By forming the inclined plane and the vertical plane as described above, the space volume of the kerf 110 increases due to the increase in the space of the bottom portion 112, and accordingly, the drainage performance of the kerf 110 may be improved. In addition, the cross-section of the bottom portion 112 has a pentagonal shape with an upper part being a triangle and a lower part being a square, and compared to the block 100 of a first embodiment, the rigidity supplementation effect may be increased in the block 100 of a second embodiment.

The connection part between the road surface portion 111 and the slope may be curved to be formed as a curved surface having a rounded radius Ra, and the connection part between the bottom surface of the bottom portion 112, which is a plane, and the slope may also be curved to be formed as a curved surface having a rounded radius Rb.

Here, the curvature radius Ra of the connection part between the road surface portion 111 and the slope may be formed to be 0.5 to 5 mm. In addition, the curvature radius Rb of the connection part between the bottom surface of the bottom portion 112 and the vertical surface may be formed to be 0.3 to 1.5 mm. In addition, the curvature radius Rc of the connection part between the slope and the vertical surface may be formed to be 0.3 to 5 mm. In addition, the width w1 of the bottom surface may be formed to be 3 mm or less.

The depth d1 of the bottom portion 112 may be formed to be 2 to 6 mm. In addition, the total depth d2 of the kerf 110 may be formed to be 5 to 10 mm. In addition, the height d3 of the protrusion part 120 may be formed to be 1.5 to 5 mm.

In a second embodiment, the opposite side wall surfaces of the road surface portion 111 may be formed as a plane, and accordingly, the thickness t1 of the road surface portion 111, which is the distance between the opposite side wall surfaces of the road surface portion 111, may be formed uniformly along the depth direction of the road surface portion 111. Here, the thickness t1 of the road surface portion 111 may be formed to be 0.4 to 0.8 mm. In addition, the distance t2 between the protrusion part 120 and the other side wall surface of the road surface portion 111 may be formed to be 0.2 to 0.6 mm.

Each numerical range in a second embodiment is not limited, and each numerical range may be changed depending on the required performance of the block 100.

As shown in FIG. 5 and FIGS. 6A and 6B, in the kerf 110 formed in the block 100 according to a third embodiment of the present invention, a channel portion may further be provided having a channel 131 formed in the shape of a groove extending in the depth direction of the road surface portion 111 at a corresponding position of each of the opposite side wall surfaces of the road surface portion 111. In addition, the distance between the opposite side wall surfaces of the bottom portion 112 may gradually increase as the depth of the bottom portion 112 increases.

Specifically, the channel 131 is formed in the shape of a groove with a semicircular cross-section, and one channel 131 may be formed on one side wall surface of the road surface portion 111, and another channel 131 may be formed at a position corresponding to the one channel 131 on the other side wall surface of the road surface portion 111. In this case, the space of the channel portion may have a rod shape.

The above-mentioned channel portions may be formed in multiples while forming a constant interval in the lengthwise direction of the kerf 110, and each channel portion may be formed in a different part of the road surface portion 111 by avoiding the part where the protrusion part 120 is formed.

Likewise, when the space of the channel portion has a rod shape, the diameter of the rod shape may be formed to be 1 to 3 mm. In addition, the gap between each channel portion may be formed as 4 to 30 mm.

In embodiments of the present invention, it is described that the spatial shape of the channel portion is formed as a rod shape as described above, but it is not necessarily limited thereto, and depending on the cross-sectional shape of the channel 131, the spatial shape of the channel portion may have a different bar shape than the rod.

By forming the channel portion as described above, the spatial volume of the kerf 110 increases and at the same time, a flow path is formed from the bottom portion 112 to the outside, so that the drainage performance of the kerf 110 may be improved.

In addition, in order to form the channel portion as described above, a rod-shaped support member may be formed on the blade installed for forming the kerf 110 in a mold for tire manufacturing, and by this support member, deformation of the blade may be prevented during tire forming, accordingly, deformation of the kerf 110 may be reduced during tire forming, and the manufacturing efficiency of the kerf 110 according to the design may be increased.

As shown in FIG. 6A, in the cross-section perpendicular to the lengthwise direction of the block 100, as the depth of the bottom portion 112 in a third embodiment increases, the distance between the opposite side wall surfaces of the bottom portion 112 gradually increases, so that an inclined surface, which is a portion inclined on both sides, may be provided.

By forming the slope as described above, the space volume of the kerf 110 increases due to the increase in the space of the bottom portion 112, and accordingly, the drainage performance of the kerf 110 may be improved. In addition, the cross-section of the bottom portion 112 has an overall triangular shape, so that the size of the cross-section of the bottom portion 112 gradually increases when worn, and the space (Void) of the kerf 110 may be secured.

The connection part between the road surface portion 111 and the slope may be curved to be formed as a curved surface having a rounded radius Ra, and the connection part between the bottom surface of the bottom portion 112, which is a plane, and the slope may also be curved to be formed as a curved surface having a rounded radius Rb.

Here, the curvature radius Ra of the connection part between the road surface portion 111 and the slope may be formed to be 0.5 to 5 mm. In addition, the curvature radius Rb of the connection part between the bottom surface of the bottom portion 112 and the slope may be formed to be 0.3 to 1.5 mm. In addition, the width w1 of the bottom surface may be formed to be 3 mm or less.

The depth d1 of the bottom portion 112 may be formed to be 2 to 6 mm. In addition, the total depth d2 of the kerf 110 may be formed to be 5 to 10 mm. In addition, the height d3 of the protrusion part 120 may be formed to be 1.5 to 5 mm.

In a third embodiment, the portion of the opposite side wall surfaces of the road surface portion 111 excluding the channel portion may be formed as a plane, and accordingly, the thickness t1 of the road surface portion 111, which is the distance between the planes among the opposite side wall surfaces of the road surface portion 111, may be formed uniformly along the depth direction of the road surface portion 111. Here, the thickness t1 of the road surface portion 111 may be formed to be 0.4 to 0.8 mm. In addition, the distance t2 between the protrusion part 120 and the other side wall surface of the flat road surface portion 111 may be formed to be 0.2 to 0.6 mm.

Each numerical range in a third embodiment is not limited, and each numerical range may be changed according to the required performance of the block 100.

As shown in FIG. 7 and FIGS. 8A and 8B, in the kerf 110 formed in the block 100 according to a fourth embodiment of the present invention, a channel portion may further be provided having a channel 131 formed in the shape of a groove extending in the depth direction of the road surface portion 111 at a corresponding position of each of the opposite side wall surfaces of the road surface portion 111. In addition, the distance between the opposite side wall surfaces of the bottom portion 112 may gradually increase as the depth of the bottom portion 112 increases and then become constant.

Specifically, the channel 131 is formed in the shape of a groove with a semicircular cross-section, and one channel 131 may be formed on one side wall surface of the road surface portion 111, and another channel 131 may be formed at a position corresponding to the one channel 131 on the other side wall surface of the road surface portion 111. In this case, the space of the channel portion may have a rod shape.

The above-mentioned channel portions may be formed in multiples while forming a constant interval in the lengthwise direction of the kerf 110, and each channel portion may be formed in a different part of the road surface portion 111 by avoiding the part where the protrusion part 120 is formed.

Likewise, when the space of the channel portion has a rod shape, the diameter of the rod shape may be formed to be 1 to 3 mm. In addition, the gap between each channel portion may be formed to be 4 to 30 mm.

In embodiments of the present invention, it is described that the spatial shape of the channel portion is formed as a rod shape as described above, but it is not necessarily limited thereto, and depending on the cross-sectional shape of the channel 131, the spatial shape of the channel portion may have a different bar shape than the rod.

By forming the channel portion as described above, the spatial volume of the kerf 110 increases and at the same time, a flow path is formed from the bottom portion 112 to the outside, so that the drainage performance of the kerf 110 may be improved.

In addition, in order to form the channel portion as described above, a rod-shaped support member may be formed on the blade installed for forming the kerf 110 in a mold for tire manufacturing, and by this support member, deformation of the blade may be prevented during tire forming, accordingly, deformation of the kerf 110 may be reduced during tire forming, and the manufacturing efficiency of the kerf 110 according to the design may be increased.

As shown in FIG. 8A, in a cross-section perpendicular to the lengthwise direction of the block 100, as the depth of the bottom portion 112 increases, the distance between the opposite side wall surfaces of the bottom portion 112 gradually increases and then becomes constant, so that an inclined surface, which is a portion inclined on both sides, and a vertical surface extending from the inclined surface in a direction perpendicular to the bottom surface may be provided.

By forming the inclined plane and the vertical plane as described above, the space volume of the kerf 110 increases due to the increase in the space of the bottom portion 112, and accordingly, the drainage performance of the kerf 110 may be improved. In addition, since the cross-section of the bottom portion 112 has a pentagonal shape with the upper part being a triangle and the lower part being a square, the force applied to the outer surface of the block 100 is also supported by the vertical plane, so that the rigidity supplementary effect may be increased in the block 100 of the fourth embodiment compared to the block 100 of the third embodiment.

The connection part between the road surface portion 111 and the slope may be curved to be formed as a curved surface having a rounded radius Ra, and the connection part between the bottom surface of the bottom portion 112, which is a plane, and the slope may also be curved to be formed as a curved surface having a rounded radius Rb.

Here, the curvature radius Ra of the connection part between the road surface portion 111 and the slope may be formed to be 0.5 to 5 mm. In addition, the curvature radius Rb of the connection part between the bottom surface of the bottom portion 112 and the vertical surface may be formed to be 0.3 to 1.5 mm. In addition, the curvature radius Rc of the connection part between the slope and the vertical surface may be formed to be 0.3 to 5 mm. In addition, the width w1 of the bottom surface may be formed to be 3 mm or less.

The depth d1 of the bottom portion 112 may be formed to be 2 to 6 mm. In addition, the total depth d2 of the kerf 110 may be formed to be 5 to 10 mm. In addition, the height d3 of the protrusion part 120 may be formed to be 1.5 to 5 mm.

In a fourth embodiment, the portion of the opposite side wall surfaces of the road surface portion 111 excluding the channel portion may be formed as a plane, and accordingly, the thickness t1 of the road surface portion 111, which is the distance between the planes among the opposite side wall surfaces of the road surface portion 111, may be formed uniformly along the depth direction of the road surface portion 111. Here, the thickness t1 of the road surface portion 111 may be formed to be 0.4 to 0.8 mm. In addition, the distance t2 between the protrusion part 120 and the other side wall surface of the flat road surface portion 111 may be formed to be 0.2 to 0.6 mm.

Each numerical range in a fourth embodiment is not limited, and each numerical range may be changed depending on the required performance of the block 100.

Figure 9A:
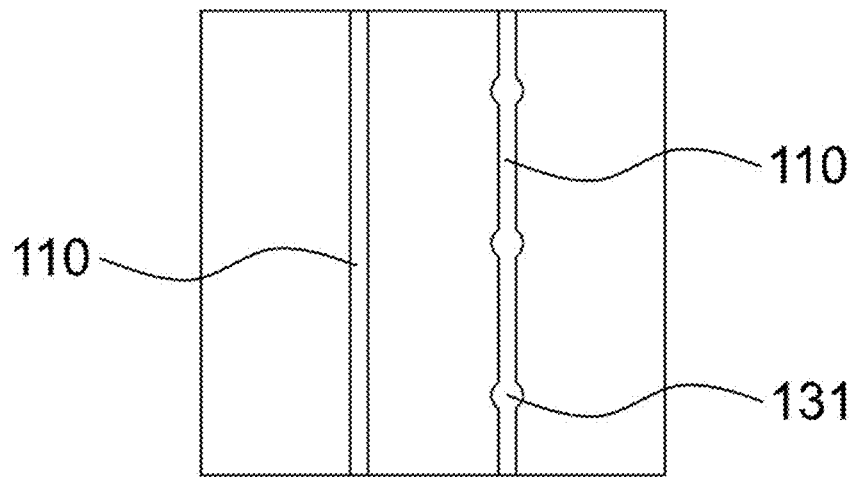
FIGS. 9A, 9B, and 9C are each a plan view of kerf according to each embodiment of the present invention.
Figure 9B:
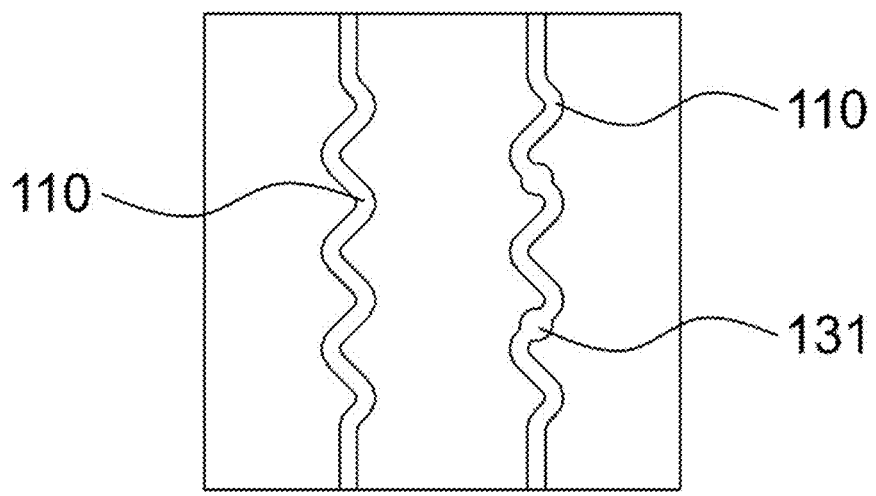
Figure 9C:
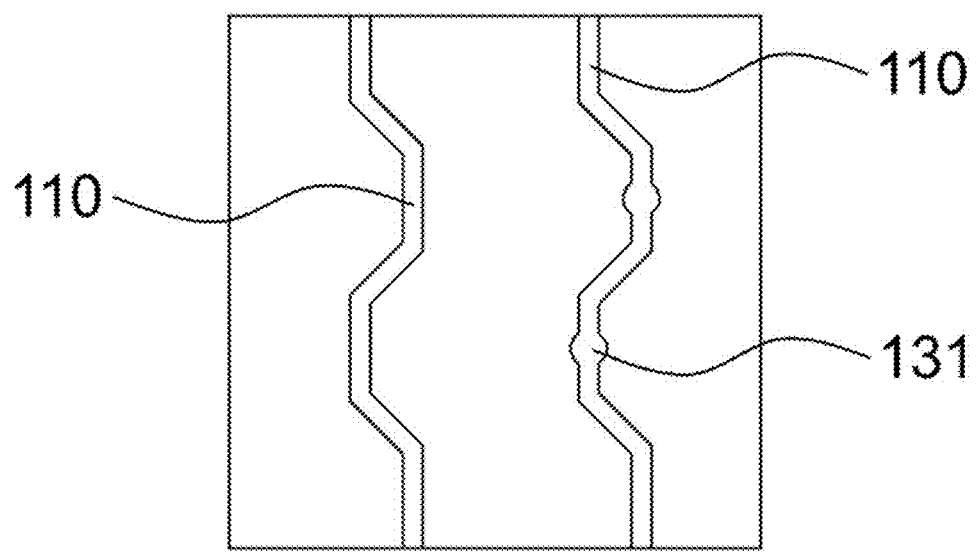

FIGS. 9A, 9B, and 9C are each a plan view of kerf 110 according to each embodiment of the present invention. Here, in each plan view of kerf 110, FIG. 9A is for a case where a straight shape is formed in the lengthwise direction of the kerf 110, FIG. 9B is for a case where a wave shape is formed in the lengthwise direction of the kerf 110, and FIG. 9C is for a case where a step shape, which is a shape that is consistently curved in the lengthwise direction of the kerf 110, is formed.

In each of FIGS. 9A to 9C, the kerf 110 on the left has a shape having a continuous surface, and the kerf 110 on the right has a shape having a channel portion. In FIG. 9A, the kerf 110 on the left may be the kerf 110 formed on the block 100 of first and second embodiments described above, and the kerf 110 on the right may be the kerf 110 formed on the block 100 of third and fourth embodiments described above.

As shown in FIGS. 9B and 9C, the kerf 110 may have a curved shape extending in the lengthwise direction of the kerf 110. Specifically, as shown in FIG. 9B, the kerf 110 may have a wave shape in the lengthwise direction of the kerf 110. In addition, as shown in FIG. 9C, the kerf 110 may have a repeatedly and consistently curved shape in the lengthwise direction of the kerf 110.

Here, the protrusion part 120 may be formed in all parts, and the channel portion may be formed in a curved part or a flat part where the protrusion part 120 is not formed. As described above, since the kerf 110 has a shape in the lengthwise direction, the spatial volume of the kerf 110 increases, and the contact efficiency between the protrusion part 120 and the side wall surface of the road surface portion 111 increases with respect to the direction of the force applied to the block 100 at various angles, the drainage performance, braking performance, traction performance, etc. of the tire may be improved.

Figure 10:
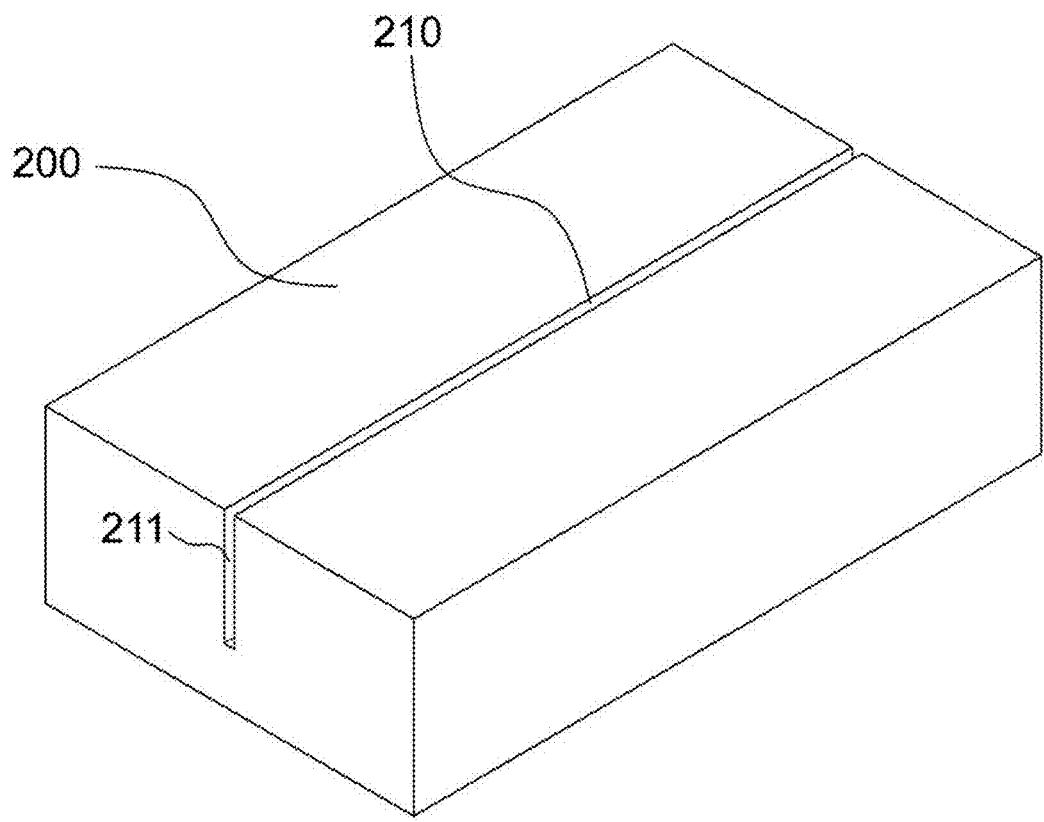
FIG. 10 is a perspective view of a block according to a comparative example of the present invention.

FIG. 10 is a perspective view of a block 200 according to a comparative example of the present invention. As shown in FIG. 10, the block 200 of a comparative example is a block 200 in which kerf 210 is formed only in the shape of a road surface portion 211 of which the depth is extended throughout, and the depth and length of the kerf 210 are the same as the depth and length of each kerf 110 formed in the block 100 of first to fourth embodiments.

Figure 12A:
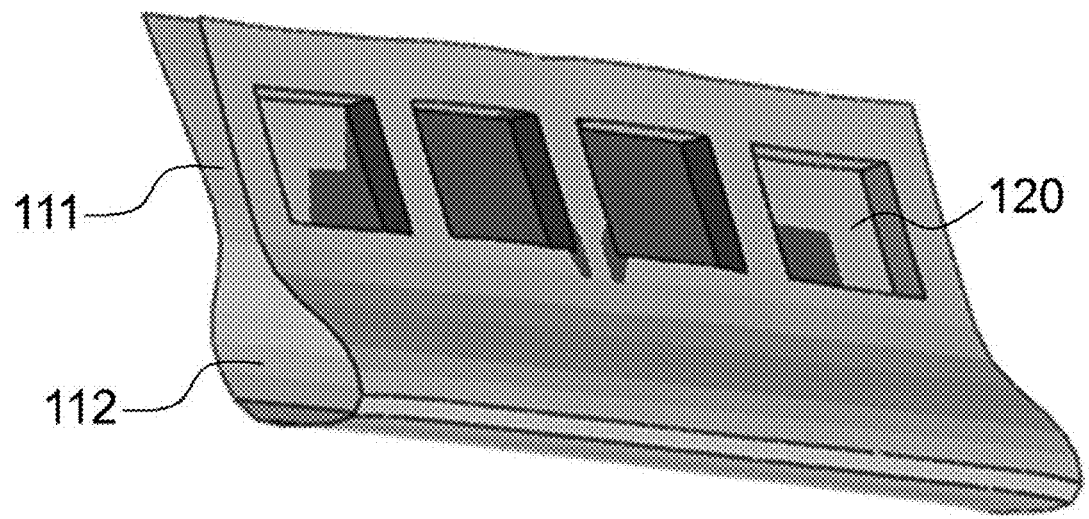
FIGS. 12A and 12B are each an image of a result of analysis performed during driving using a block according to the first embodiment of the present invention.
Figure 12B:
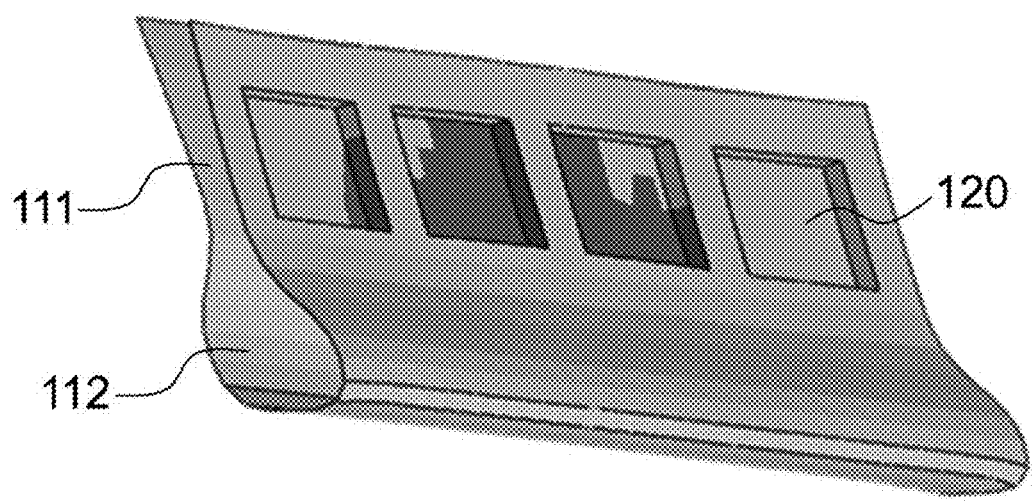

FIG. 11 is data on tests using blocks 200 of respective embodiments and a comparative example of the present invention. In addition, FIGS. 12A and 12B are each an image of a result of analysis performed during driving using a block 100 according to a first embodiment of the present invention. In FIGS. 12A and 12B, the red area is the area where the other side wall of the road surface portion 111 and the protrusion part 120 come into contact.

Specifically, FIG. 12A is for the case where the thickness t1 of the road surface portion 111 of the kerf 110 is 0.6 mm and the distance t2 between the protrusion part 120 and the other side wall surface of the road surface portion 111 is 0.4 mm, and FIG. 12B is for the case where the thickness t1 of the road surface portion 111 of the kerf 110 is 0.6 mm and the distance t2 between the protrusion part 120 and the other side wall surface of the road surface portion 111 is 0.3 mm.

As shown in FIG. 11, when the kerf 110 of the block 100 is formed with a predetermined numerical value in each block 100 of first to fourth embodiments, it may be confirmed that the rigidity of the block 100 increases compared to a comparative example and the rigidity of the block 100 increases even when the spatial volume of the kerf 110 increases.

In addition, as shown in FIGS. 12A and 12B, in the block 100 of a first embodiment, when the thickness t1 of the road surface portion 111 of the kerf 110 is 0.6 mm and the distance t2 between the protrusion part 120 and the other side wall surface of the road surface portion 111 is 0.4 mm, the contact area of the protrusion part 120 increases, and it may be confirmed that the rigidity of the block 100 increases as described above.

The description of the present invention described above is for illustrative purposes, and those skilled in the art will understand that the present invention is easily modifiable into other specific forms without changing the technical idea or essential features of the present invention. Therefore, the embodiments described above should be understood in all respects as illustrative and not restrictive. For example, each component described as single may be implemented in a distributed manner, and similarly, components described as distributed may also be implemented in a combined form.

The scope of the present invention is indicated by the claims described below, and all changes or modified forms derived from the meaning and scope of the claims and their equivalent concepts should be construed as being included in the scope of the present invention.

EXPLANATION OF REFERENCE NUMERALS

100: block
110: kerf
111: road surface portion
112: bottom portion
120: protrusion part
131: channel
200: block
210: kerf
211: road surface portion

The invention claimed is:

1. A tire having a 3D kerf in which an interlocking band and a hidden groove-type kerf are combined, the tire comprising:
a kerf having:
a road surface portion, which is a first space extending in a thickness direction of a block of the tire from an outer surface of the block, the outer surface of the block being configured to be in contact with a road surface, the road surface portion including a first side wall surface and a second side wall surface facing each other; and
a bottom portion, which is a second space extending in the thickness direction of the block from the road surface portion; and
a plurality of protrusion parts that protrudes from the first side wall surface of the road surface portion,
wherein a distance between opposite side wall surfaces of the bottom portion is variable in a depth direction of the bottom portion,
wherein, in a cross section perpendicular to a lengthwise direction of the kerf, as a depth of the bottom portion increases, the distance between the opposite side wall surfaces of the bottom portion increases, such that inclined surfaces are defined on opposite sides of the bottom portion, respectively,
wherein a connection region between each of the opposite side wall surfaces of the road surface portion and each of the inclined surfaces of the bottom portion is rounded and has a curved surface having a radius of curvature,
wherein an outer end of each of the plurality of protrusion parts facing the second side wall surface of the road surface portion is spaced apart from the second side wall surface of the road surface portion,
wherein the tire further comprises a channel portion including:
a plurality of first channels, each having a first groove extending in a depth direction of the road surface portion on the first side wall surface of the road surface portion; and
a plurality of second channels, each having a second groove extending in the depth direction of the road surface portion at a position corresponding to a respective one of the plurality of first channels on the second side wall surface of the road surface portion,
wherein the plurality of first channels is disposed on the first side wall surface of the road surface portion where the plurality of protrusion parts is not disposed, such that the plurality of first channels and the plurality of protrusion parts are disposed in an alternating manner.

2. The tire of claim 1, wherein each of the first and second side wall surfaces of the road surface portion a continuous surface extending along the lengthwise direction of the kerf.

3. The tire of claim 1, wherein as the depth of the bottom portion increases, the distance between the opposite side wall surfaces of the bottom portion increases and then becomes constant.

4. The tire of claim 1, wherein as the depth of the bottom portion increases, the distance between the opposite side wall surfaces of the bottom portion increases and then becomes constant.

5. The tire of claim 1, wherein each of the plurality of protrusion parts has a rectangular solid shape.

6. The tire of claim 1, wherein the kerf has a curved shape extending in the lengthwise direction of the kerf.

* * * * *